Dec. 1, 1964   J. F. ZALESKI   3,159,836
PASSIVE BEACON
Filed Dec. 23, 1960   2 Sheets-Sheet 1
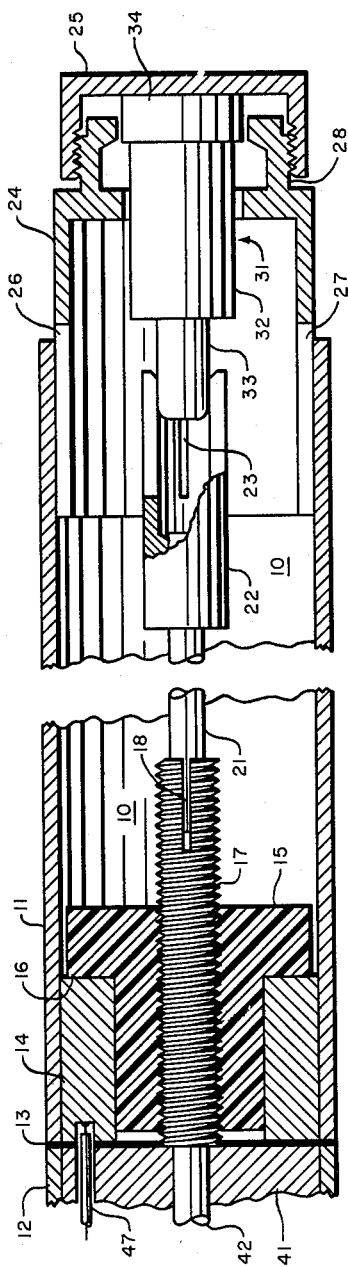
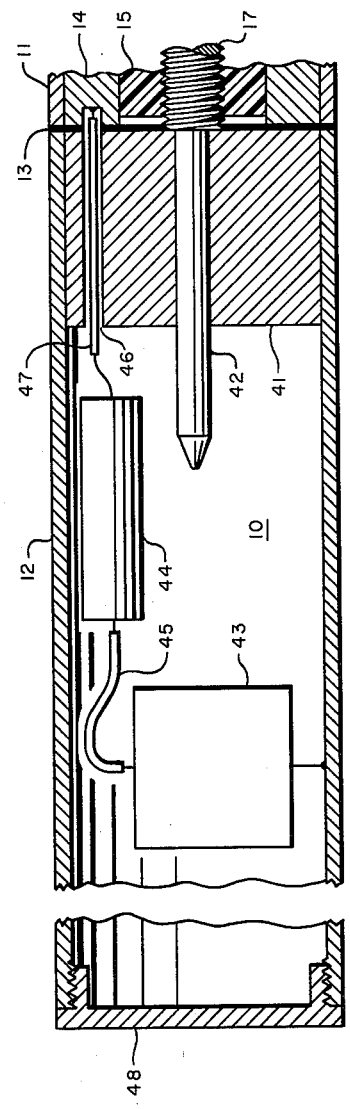
INVENTOR.
JOHN F. ZALESKI
BY
ATTORNEY.

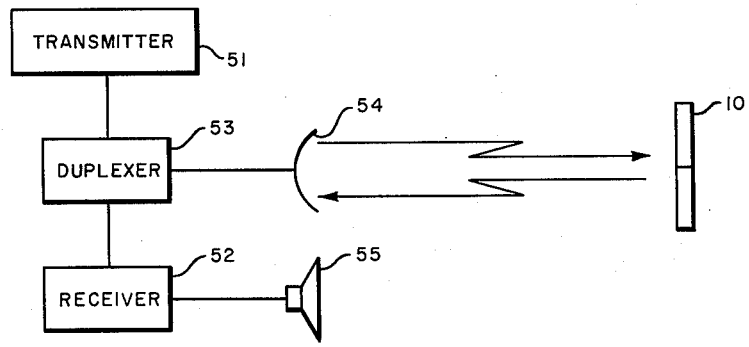
Fig-2
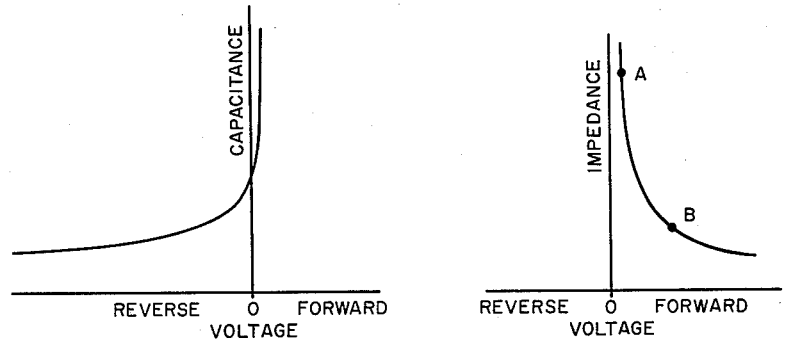
Fig-3    Fig-4
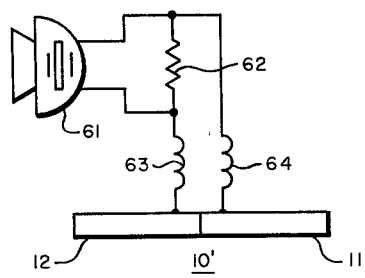
Fig-5
INVENTOR.
JOHN F. ZALESKI
BY 
ATTORNEY.

United States Patent Office 3,159,836
Patented Dec. 1, 1964

3,159,836
PASSIVE BEACON
John F. Zaleski, Pleasantville, N.Y., assignor to General Precision, Inc., a corporation of Delaware
Filed Dec. 23, 1960, Ser. No. 78,045
6 Claims. (Cl. 343—18)

This invention relates to beacons of the kind which, in response to incident radio frequency energy, radiate a distinctive radio frequency signal.

Beacons may be divided generally into two classes, "active" and "passive." An active beacon, as that term is used herein, is one which requires, and is provided with a local source of energy, such as a battery. A passive beacon, as that term is used herein, is one which requires no local source of energy, relying for operation on the received radio frequency energy.

Beacons of either the active or passive variety may be installed at known locations to aid in the navigation of aircraft along established routes and to aid marine navigation in harbor areas. A less obvious use is that of trail markers in polar ice cap regions where recognizable terrain features are absent and where visibility may be extremely limited. However, as far as applicant is aware, beacons have not been used extensively in polar regions, probably because no beacon has been available which is capable of satisfactory operation under the severe environmental conditions encountered.

In the Antarctic and Greenland ice cap environments, snow trains usually move at from 1½ to 2½ knots. It is customary to mark the trail with bamboo poles topped with yellow nylon flags which are inserted into the snow at intervals of 50 feet to ¼ mile. The heading reference carried by the train is usually of limited accuracy and accordingly the train stops frequently to backsight the line of flags with a theodolite to insure holding course. If an aircraft is to rendevous with the train it does so by following the flag trail.

The above procedure has a number of disadvantages. First, considerable time is consumed in placing the flags and making the necessary backsights. Second, if visual contact with the flags is lost the train must stop because if it veers away from the trail or trail direction it may become hopelessly lost. Third, the low altitude flying of a rendevous plane is extremely hazardous especially in view of "white out" loss of depth perception.

Obviously there is room for improvement in the field of trail markers, and beacons appear to be an attractive solution. However, as mentioned before, no beacon hitherto available has been satisfactory.

It is a general object of the present invention to provide a beacon suitable for use as a trail marker in polar regions.

Subsidiary objects of the invention are to provide a beacon of small size and weight, low cost, requiring no local power supply, operable both on the surface and then buried in snow, and requiring little or no installation time.

The beacon of the invention meets the above requirements but is in no way dependent upon a polar environment for operation. It may be used almost anywhere indoors or out, on the surface of the ground or on a buoy in a harbor, and will radiate its distinctive signal (thereby identfying its position) whenever it is irradiated by radio frequency energy of suitable frequency.

Briefly stated, the invention comprises two hollow cylindrical conductive tubes joined by a thin dielectrical spacer so as to form a dipole antenna. The interior of the tubes includes a circuit resonant at the same frequency as and coupled to the dipole antenna. The resonant circuit includes a semiconductor diode such as a varactor the impedance of which is a function of the voltage thereacross. When the energy level received by the dipole exceds a certain minute threshold level, the circuit elements including the varactor causes a relaxation oscillation to occur at an audio frequency thereby modulating the radio frequency energy which is reradiated by the dipole.

For a clearer understanding of the invention, reference may be made to the following detailed description and the accompanying drawing, in which:

FIGURES 1a and 1b together are a cross section view of a preferred embodiment of the invention;

FIGURE 2 is a schematic block diagram showing how the invention is used;

FIGURES 3 and 4 are graphs useful in explaining the invention; and

FIGURE 5 is a schematic diagram of a modification of the invention.

Referring first to FIGURE 1a, the entire beacon is denoted generally by the reference character 10 and includes a first hollow cylindrical tube 11 made of a conductive material such as brass or aluminum. This tube is mechanically joined coaxially to a second similar tube 12, part of which can be seen in FIGURE 1a and which is more fully shown in FIGURE 1b. The two tubes are insulated from each other by a thin washer 13, on the order of 0.002" thick, made of a low loss dielectric material such as that sold under the proprietary name "Teflon." As shown in FIGURE 1a, the end of the tube 11 adjacent to the tube 12 is partially closed by an annular brass block 14 soldered or otherwise connected electrically and mechanically to the tube 11. The block 14 has an axial bore into which is press fitted a washer 15 having an annular flange 16 which abuts the end of the block 14 remote from the end of the tube 11. The washer 15 is made of a low loss dielectric material such as that sold under the proprietary name "Stycast." Threaded completely through an axial bore in the washer 15 is a brass rod 17, one end of which extends along the axis into tube 11 and the other end of which extends into the tube 12. The end projecting into the tube 11 has an axial bore and is formed with four narrow slots parallel to the axis of the rod, one of which can be seen at 18, and each of which extends from the exterior threaded portion of the rod 17 into the bore.

A brass rod 21 extends into the bore in the rod 17 where it is held by friction. The rod 21 extends along the axis of the tube 11 toward the end remote from the tube 12, the major portion of the length of the rod 21 not being shown in the drawing in order to permit the other parts to be shown to a larger scale. A generally cylindrical coupling member 22 having a larger diameter than the rod 21 has an axial bore a portion of which is of substantially the same diameter as the rod 21 into which the end of the rod extends where it is electrically and mechanically fastened as by soldering. The end of the coupling member 22 remote from the rod 21 has an enlarged axial bore and is formed with four narrow slots, parallel to the axis, equiangularly spaced, and extending from the periphery into the bore. One of these slots can be seen at 23 in FIGURE 1a.

The end of the tube 11 remote from its junction with tube 12 is closed by means of an assembly comprising a generally tubular cylindrical member 24 and a cup shaped member 25, each made of a conductive material such as brass. The member 24 has an outside diameter substantially equal to the inside diameter of the tube 11 and fits inside the tube 11 as shown. The member 24 is provided with four narrow slots parallel to and equally spaced about its axis and extending from the periphery to the interior. The presence of two of these slots can be seen in FIGURE 1a wherein the portions 26 and 27 of the member 24 appear in elevation. These slots provide resiliency so as to enable the member 24 to slide in and out of the tube 11. An end portion 28 of the member 24 is of reduced diameter and is provided with external threads which mate with internal threads on the cup shaped member 25, thereby closing the end of the tube 11.

A semiconductor diode 31 of the kind in which the capacitance and the impedance are each a function of the applied voltage, commonly called a varactor, is positioned and electrically connected between the coupling member 22 and the cup shaped member 25. The particular varactor for which the illustrated embodiment of the invention was designed has a cylindrical body portion 32 covered with insulating material. One electrode is internally connected to a cylindrical metal rod like terminal 33 which fits into and is clamped by the coupling member 22. The other electrode is internally connected to a cup shaped metal terminal 34 which abuts the interior surface of the cup shaped member 25. One group of varactors having the above described external physical characteristics, and which are suitable for use in the present invention, are commercially available from Microwave Associates, Inc., Burlington, Massachusetts, and are designated as Models 460A to 460E inclusive. It will be understood that other varactors having different external connections, such as pigtail leads, can also be used by suitably modifying the mounting and connecting arrangements. The important thing is that the varactor, of whatever type, be connected between the member closing the tube 11 (the member 25 in FIGURE 1a) and the rod 21.

Referring now to FIGURE 1b, a cylindrical metal block 41 closes the end of the tube 12 which is adjacent to the tube 11. The block 41 is soldered or otherwise mechanically fastened and electrically connected to the tube 12 and is formed with an axial bore through which extends the reduced diameter end portion 42 of the rod 17. This construction provides good mechanical support for the rod 17, aids in mechanically joining the tubes 11 and 12, and connects the rod 17 electrically to the tube 12.

An audio frequency choke 43 having an inductance of about two henrys and a radio frequency choke 44 having an inductance of about one microhenry are serially connected between the tube 12 and the tube 11. The audio frequency choke used in the specific embodiment being described is, externally, in the form of a small cube about 5/16" on a side while the radio frequency choke is packaged in a cylindrical form about 1/8" in diameter and about 3/8" long. Chokes of these small sizes may conveniently be placed inside the tube 12 as shown. One terminal of the choke 43 is connected to the interior of the tube 12 as by soldering while the other terminal is connected by an insulated conductor 45 to one terminal of the choke 44. The block 41 has an aperture 46 extending completely therethrough which is aligned with an aperture in the dielectric washer 13. Both apertures are aligned with a shallow bore in the block 14. An insulated conductor 47 passing through these apertures connects the other terminal of the choke 44 to the block 14, which in turn makes contact with the tube 11. The chokes 43 and 44 provide a low impedance path for direct current between the tubes 11 and 12 while providing a high impedance path for alternating current. The choke 44 is required in addition to the choke 43 because the capacitance between turns in the choke 43 provides a low impedance path for radio frequencies through the choke 43.

The open end of the tube 12 may be closed by an end plate 48 threaded to the tube 12 as shown in order to seal out dirt and moisture.

By way of example, an embodiment of the invention has been constructed in which each of the tubes 11 and 12 was approximately 9" long so that the two tubes constituted a dipole antenna resonant to radio frequencies in the 400 mc. band. The tubes each had an inside diameter of 0.5" and the other parts were in proportion, approximtaely as shown in FIGURES 1a and 1b.

FIGURE 2 shows how the apparatus of the invention may be used. There is shown a transmitter 51 and a receiver 52 interconnected by a duplexer 53 to a directional antenna 54, schematically shown as a paraboloid, although of course other forms of antenna such as a linear array may be used. A loudspeaker 55 is connected to the receiver 52. It has been found that when the beacon 10 is placed within the field of radio frequency energy radiated by the antenna 54, an audio tone is heard at the loudspeaker 55. When the beacon 10 is moved nearer to the antenna 54, the frequency of the tone heard decreases, while when the beacon is moved farther away the frequency increases. Similarly, the frequency is lowest when the beacon is in the center of the beam and increases as it is moved toward one side. Likewise, the frequency is lowest when the beacon is aligned with the lines of electric force of the incident field. It has been found that there is a threshold of power on the order of 1/10 microwatt required to be incident on the beacon 10 to start oscillations so as to exhibit the effects noted above. There is probably a maximum power above which oscillations will not occur but as yet this maximum value has not been determined.

The causes of the phenomena discussed above have not as yet been fully investigated and accordingly are not, at present, fully understood. However, the characteristics of the varactors used are known and the following explanation, based on these characteristics and believed to be correct, is offered.

The equivalent circuit of a varactor biased in the reverse direction is that of a capacitance in series with a small resistance. The shunt resistance is so large that it may usually be ignored. FIGURE 3 shows qualitatively how the capacitance varies with applied voltage. As the voltage is reduced from a comparatively large value in the reverse direction the capacitance increases smoothly at a moderate rate until, as the voltage approaches zero, the rate of increase rises. At a very small forward bias voltage, the capacitance approaches an infinite value.

The equivalent circuit of a varactor biased in the forward direction is that of a capacitance shunted by a resistance. FIGURE 4 shows how the impedance varies with applied voltage in the forward bias direction. At a very low voltage near zero the impedance is very high, on the order of several megohms or more, as indicated by point A on the curve. The impedance drops sharply as the voltage is increased until, at 0.1 volt or less, the impedance has dropped to a few hundred ohms, as shown by point B on the curve.

When a varactor is used as a voltage dependent capacitance it is ordinarily operated in the reverse bias region where the capacitance varies smoothly as shown in FIGURE 3. It is the characteristic in the forward bias region shown in FIGURE 4 which is believed to play the major part in the operation of the present invention.

The tubes 11 and 12 constitute a dipole antenna resonant at the frequency of the transmitter. The interior of the tube 11 and the central conductor (the rods 17 and 21, the coupling member 22 and the varactor 31) constitutes a reentrant cavity resonator, tuned to the frequency of the dipole antenna. The sliding contacts provided by the slots 18 in the rod 17, the slots 23 in the coupling member 22 and the slots in the tubular member 24 shown at 26 and 27, allow the cavity to be tuned by adjusting its length.

In the absence of a radio frequency field no voltage appears across the varactor 31 and it has a high impedance as indicated by FIGURE 4. It will be recalled that the rod 17 is electrically connected, through its end portion 42 and the block 41, to the tube 12 while the varactor terminal 34 is electrically connected through the members 25 and 24 to the tube 11. Accordingly, a radio frequency field incident on the dipole comprised of tubes 11 and 12 will excite the cavity resonator and cause a voltage to appear across the varactor 31, this voltage being a function of the resonant impedance of the tuned circuit which, in the present example, is very high. As the voltage increases in the forward direction the impedance of the varactor decreases suddenly, as shown in FIGURE 4. The impedance of the varactor does not fluctuate at the rate of the fluctuations of the radio frequency field. When the impedance drops to its low value, it remains at its low value due to the combined action of the inherent recovery time of the varactor and the energy stored in the capacitance of the varactor and in the chokes 43 and 44. Eventually the varactor returns to its high impedance condition whereupon the voltage there across again increases, the impedance decreases and the cycle is repeated.

The changes in varactor impedance cause corresponding changes in the loading of the cavity resonator and in the loading of the dipole antenna. These load changes in turn cause corresponding changes in the amplitude and in the relative phase of the radio frequency energy radiated by the dipole antenna to the receiver. Since the changes occur at an audio frequency an audible tone is heard from the loudspeaker.

The impedance changes are in the nature of relaxation oscillations and the frequency at which these oscillations occur is a function of the varactor characteristics, the Q of the coaxial cavity, the resonant impedance of the combination, the impedance of the chokes 43 and 44, and the voltage impressed across the varactor. The impressed voltage in turn is a function of the strength of the incident radio frequency field and the orientation of the dipole antenna with respect to the field.

It is apparent from the foregoing description that the beacon of the present invention is a very useful device. It requires no local power supply and no installation other than placing it at the desired location. It may be placed on the surface of the earth to serve as a fix point for aircraft or may be mounted on a channel marker to aid marine navigation. The cost of each unit is low enough to permit large quantities to be used economically. In uncharted regions many beacons may be used as trail markers and may be installed simply by tossing from a vehicle such as an automobile, an airplane, or a snow train. Although as shown in FIGURES 1a and 1b there are several sliding connections, it is obvious that once the proper adjustments have been determined, the parts may be soldered or otherwise fastened in place. Additionally, the entire unit may be surrounded by a sturdy dielectric covering.

The fact that the frequency of the tone heard is a function of radio frequency field strength makes the beacon of this invention very convenient to use. The human ear is much more sensitive to small variations in pitch than to small variations in amplitude and accordingly an operator in a vehicle equipped with a transmitter and receiver can readily adjust the antenna to point directly toward the beacon simply by adjusting for the lowest pitch. Additionally, a continuous lowering of the received pitch indicates that the vehicle is approaching the beacon.

The beacon of the present invention will operate in polar regions even when buried in snow or crust. Snow is essentially an accumulation of crystals of frozen fresh water and even when compacted to form a crust its absorption of radio frequency energy is quite low. It has been stated that the absorption of snow crust at 10,000 mc. is on the order of 0.7 db/meter while at 10 mc. absorption is only on the order of 0.0007 db/meter. Obviously the beacon will operate satisfactorily even when buried deeply in snow.

FIGURE 5 shows an interesting modification of the invention. The beacon 10' is identical to that shown in FIGURES 1a and 1b except that the chokes 43 and 44 have been omitted. Instead, a crystal microphone 61 shunted by a 1 megohm resistor 62 has its terminals connected through radio frequency chokes 63 and 64 to the tubes 11 and 12 as shown. It has been found that, when the apparatus of FIGURE 5 is substituted for the beacon 10 in the arrangement of FIGURE 2, acoustic signals reaching the microphone 61 are reproduced by the loudspeaker 55.

The operation of the modification of FIGURE 5 is similar to that of FIGURES 1a and 1b. However, instead of self oscillations being generated, the output voltage of the microphone 61 causes the impedance of the varactor to vary along the curve of FIGURE 4 from A to B. As before, the change in loading of the dipole antenna causes the reradiated radio frequency to be phase and amplitude modulated.

Although a preferred embodiment has been described specifically, many modifications will occur to those skilled in the art. It is therefore desired that the protection afforded by Letters Patent be limited only by the true scope of the appended claims.

What is claimed is:

1. A passive beacon for modulating and reradiating incident radio frequency energy of a predetermined frequency, comprising, an antenna resonant at said predetermined frequency, a circuit coupled to and resonant at the same frequency as said antenna, a varactor positioned and connected in said circuit to be subjected to potential variations induced in said circuit by radio frequency energy incident on said antenna whereby the impedance of said varactor is varied, and an inductance having a high impedance at audio and radio frequencies connected across the terminals of said varactor.

2. A passive beacon for modulating and reradiating incident radio frequency energy of a predetermined frequency, comprising, an antenna resonant at said predetermined frequency, a cavity resonator excited by said antenna for generating a region of high electric field strength, an element having a region of operation in which the impedance decreases rapidly with an increase in applied voltage, said element being positioned in said region of high field strength whereby radio frequency energy incident on said antenna changes the impedance of said element, and a path having a low impedance for direct current and a high impedance for alternating current connected across said element.

3. A passive beacon for modulating and reradiating incident energy at a predetermined radio frequency, comprising, first and second elongated conductive members, said first member being hollow, said members being joined together in end to end relation but insulated from each other to form a dipole antenna resonant at said predetermined frequency, a reentrant cavity resonator formed within said first member tuned to said predetermined frequency and excited by the voltage induced in said antenna, a varactor positioned in said resonator in a region of high field strength, and an inductance conductively connected across opposite terminals of said varactor.

4. A beacon comprising, first and second elongated conductive members, said first member being hollow, said members being joined together in end to end relationship but insulated from each other to form a dipole antenna, a conductive rod joined to said second member at its junction with said first member and extending within said first member along the axis thereof from said junction toward the opposite end of said first member, a conductive end plate closing said opposite end of said first member, a varactor connected between said plate and said rod, and an inductive path connecting said first and second members.

5. A beacon comprising, first and second hollow cylindrical conductive tubes each having first and second ends, said tubes being mechanically joined coaxially at their first ends but electrically insulated from each other, a conductive rod positioned on the axis of said first tube and extending from said first end toward said second end, said rod being electrically connected to the body of said second tube, a conductive cap closing said second end of said first tube, a varactor connected between said cap and said rod, and a circuit having low impedance for direct current but high impedance for alternating current interconnecting said first and second tubes.

6. A passive beacon for modulating and reradiating energy of a predetermined radio frequency incident thereon, comprising, first and second hollow cylindrical conductive tubes each having first and second ends, said tubes being arranged coaxially in end to end relationship with their first ends adjacent but separated by a dielectric washer, whereby said tubes constitute a dipole antenna, a conductive rod positioned on the axis of said first tube, said rod being mechanically connected but electrically insulated from said first end of said first tube, said rod being mechanically and electrically connected to said first end of said second tube, said rod extending toward said second end of said first tube, a conductive member closing said second end of said first tube, a varactor having a region of operation in which the impedance decreases rapidly with an increase in applied voltage, said varactor being connected between said rod and said conductive member, and a radio frequency choke and an audio frequency choke serially connected between said first and second tubes.

References Cited in the file of this patent
UNITED STATES PATENTS

| | | |
|---|---|---|
| 2,752,495 | Kroger | June 26, 1956 |
| 2,818,732 | Bennett | Jan. 7, 1958 |
| 2,853,646 | Geisler | Sept. 23, 1958 |
| 2,896,204 | Gille | July 21, 1959 |
| 2,927,321 | Harris | Mar. 1, 1960 |